Nov. 3, 1936. W. A. RUSSELL 2,059,400
POULTRY NEST
Filed June 16, 1934 2 Sheets-Sheet 1
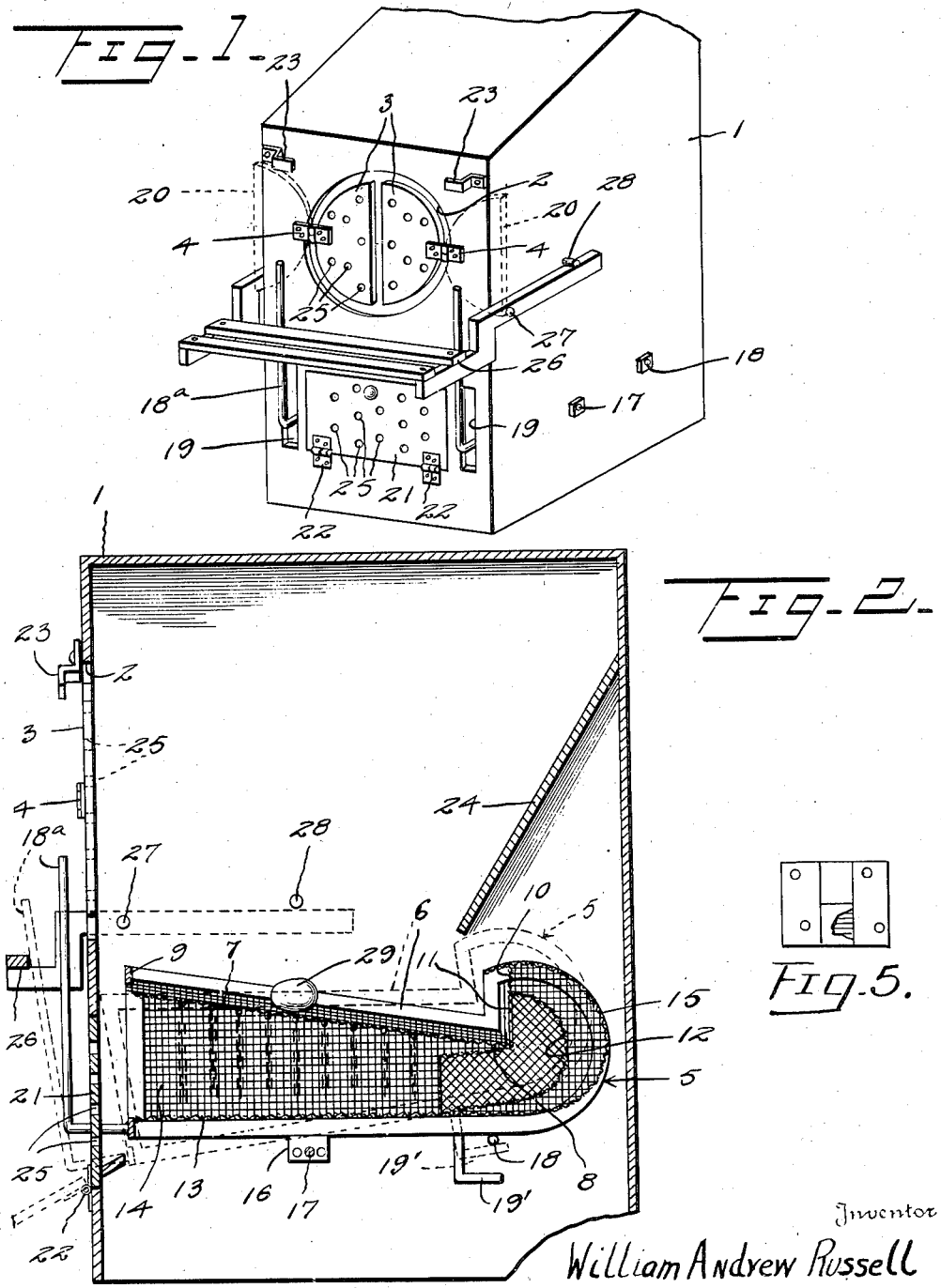

Nov. 3, 1936. W. A. RUSSELL 2,059,400
POULTRY NEST
Filed June 16, 1934 2 Sheets-Sheet 2
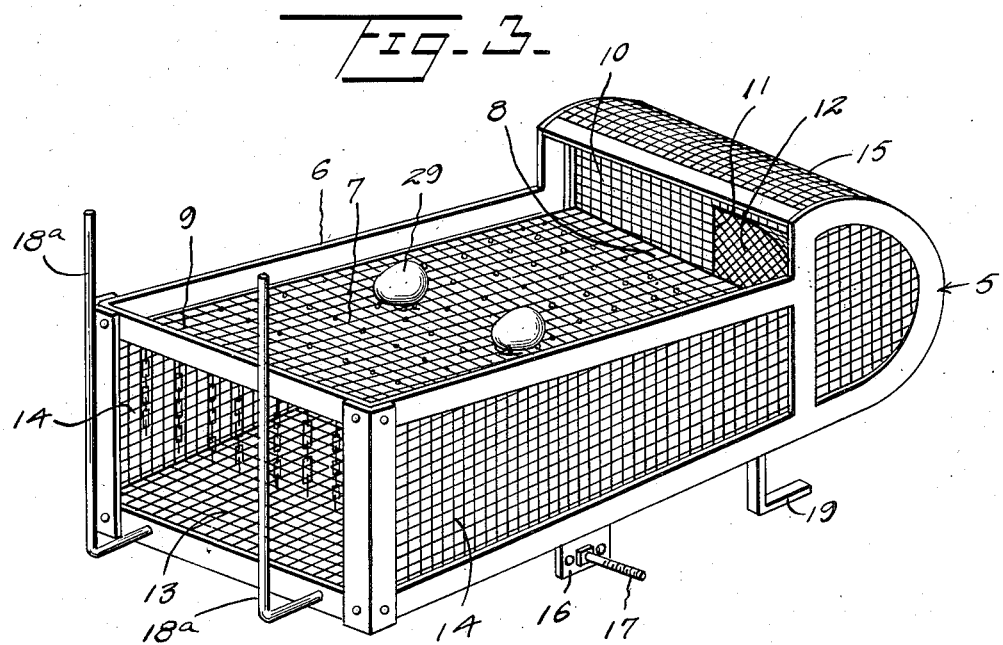
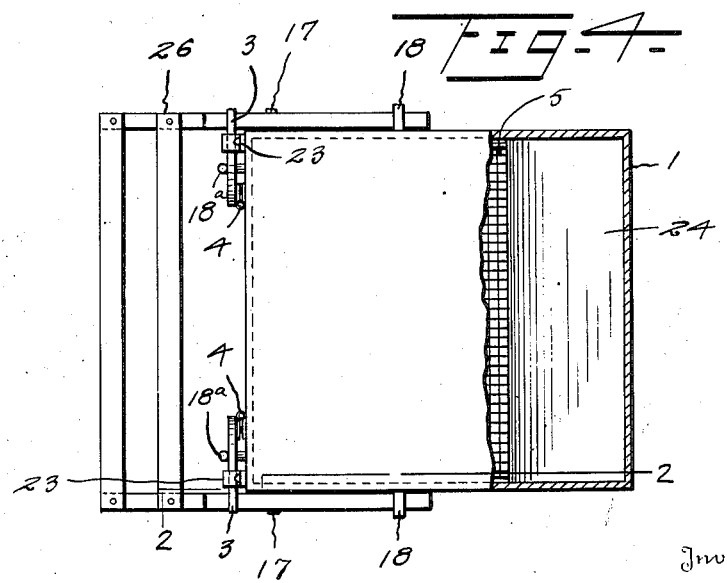
Inventor
William Andrew Russell Patented Nov. 3, 1936

2,059,400

UNITED STATES PATENT OFFICE 2,059,400

POULTRY NEST

William Andrew Russell, Chesterfield County, Va.

Application June 16, 1934, Serial No. 730,928

1 Claim. (Cl. 119—47)

This invention relates to a poultry nest and more particularly to nests adapted to segregate an egg from a fowl after the former has passed from the latter. For many years past the produce industry or business has required that eggs laid by fowl must be removed from the nest within a specific time after they have been laid to prevent germ formation; which begins about an hour after the egg passes from the fowl, and thereby causes blood streaks.

One of the objects of this invention is the provision of a nest adapted to segregate or separate the egg or eggs from the fowl after they have been laid.

Another object of the invention is the provision of a nest whereby the egg is segregated from the fowl so as to prevent body heat being transmitted to the egg.

A further object is the provision of a nest decreasing the egg breakage by the fowl or otherwise.

Further objects are prevention of a fowl from setting on the egg for breeding purposes; provision of a nest easily set up; elimination of substantially all dirt; a nest having a safety trap for ascertaining the fowl that are laying eggs; a nest whereby eggs can not pile on one another, and a nest for laying purposes and one that will prevent roosting, as well as a nest providing cleaner eggs.

Other objects and features will more fully appear from the following description and accompanying drawings in which:

Fig. 1 is a partial perspective provided with an inclined top; Fig. 2 a vertical sectional side view taken along lines 2—2 of Fig. 4, and showing a modification of the device; Fig. 3 a perspective of the nest; Fig. 4 a sectional top plan view, and Fig. 5 an enlarged sectional view of a hinge showing a portion of its spring.

Referring to the drawings, a body 1 is provided with an aperture or entrance 2 having semi-circular doors 3 spaced in circumferential fashion from said entrance, and secured to the body by spring hinges 4 that tend to keep the doors in a closed position.

A nest 5 consisting of a frame 6 is provided with an upper floor 7 having its rear or posterior portion 8 lower than its forward portion 9 so as to provide an inclination whereby an egg or round object may roll toward the rear of said nest. A vertical partition 10 is secured to said frame in perpendicular fashion. An aperture 11 connects said floor 7 with an incline 12 that forms the entrance to a lower floor 13; said lower floor being formed by wire mesh similar to upper floor 7. End 15 is rounded somewhat to form a space for the incline.

The nest is provided with journals or flanges 16 secured to said frame and having holes or apertures therein for accommodating an axle 17 that is adapted to be secured to said body portion by nuts or bolts. A rod 18 transverses the body portion and is secured to each side by bolts or the like, and is in operative relation with a stop 13' secured to the basal portion of said nest and used for limiting movement of the nest over a certain distance.

Rods 18a are secured to the base and project therefrom, through slots 19 in said body, upwardly and are adapted to engage the doors when in an open position as indicated by the dotted line position 20 in Fig. 1.

A lower door 21 is secured to the body by spring hinges 22 that tend to keep it in a closed position. Fasteners 23 are secured in pivotal fashion to the body and adapted to keep the doors 3 in open position when the trap door operation is not being used, as will more fully be explained hereinafter.

Interposed between the walls of the body is a partition 24 in close proximity to the posterior portion of the nest to prevent a fowl from roosting or engaging said latter portion.

Suspended from the upper floor 7 are a plurality of chain-like members that are adapted to swing or dangle back and forth when the egg passes down the incline in and onto said lower floor, and it is therefore obvious that these chains act to retard the movement of the egg as well as to prevent one egg from contacting another with force that would be sufficient to crack said egg were it not for the chain-like members.

The doors 3 and 21 may be provided with apertures 25 to insure adequate ventilation.

An entrance perch 26 is pivotally connected to the body by pins 27. Pins 28 project from the sides of the body and are adapted to engage the perch to prevent downward movement at a given point. It is obvious from the foregoing that the perch may be lifted so that it may be positioned in a manner that will reduce space for shipping purposes, as well as elevated at night to prevent fowl from entering the nest, as well as being elevated to permit better access to the lower compartment to secure eggs therein.

The bodies may be arranged in groups suitable to the particular poultry housing equipment, and if they are placed on top of one another the top body will, of course, be inclined as partially indicated in Fig. 1, to prevent roosting, while the lower body will be provided with flat surfaces as indicated in Fig. 2.

Artificial eggs 29 may be fastened to the upper floor 7. It is distinctly understood that no nest material, such as straw for instance, is necessary and the elimination of this will provide a clean nest, and such nest material is not necessary for a fowl laying eggs.

When it is desired to ascertain what fowl are laying eggs the doors 3 are opened and the members 18 hold said doors in such manner. When the fowl steps on the nest it tilts downwardly, as indicated in Fig. 2, and the spring doors automatically close; since said members are lowered from the path of movement of said doors. It is therefore obvious that the fowl is enclosed in the nest and the operative can ascertain the fowls, by this method, that are laying eggs.

After the fowl lays an egg, she generally moves about in the nest causing agitation of the latter, up and down, thereby causing (by such agitation) the egg to roll to the lower floor.

The invention operates as follows: the fowl alights on the perch and enters the nest and its weight tips it downwardly. When the fowl lays the egg it rolls downwardly through the entrance and to the lower floor where its movement is retarded by the chain-like members, and then comes to a rest. It is obvious that eggs can not pile on one another and are separated from the fowl.

Having described the invention, what is claimed is:

In a poultry nest consisting of a body portion provided with an entrance; a nest pivotally connected with said body portion and provided with an upper floor; an incline engaging said upper floor; spring hinged doors pivotally connected with said body portion at said entrance; a lower floor in operative relation with said incline; rods secured to said nest and projecting through slots in the front of said body portion and adapted to respectively hold said hinged doors in open position substantially parallel with the front of said body portion when in the path of movement of said doors, and when said rods are lowered out of the path of said doors to release the latter for the purpose of permitting the closing of said doors caused by the force of said hinges on said doors, and pivotal means on said body portion for holding said doors, against the pressure of said hinges, in open position.

WILLIAM ANDREW RUSSELL.